(12) United States Patent
Villegas Nunez et al.

(10) Patent No.: US 12,407,159 B2
(45) Date of Patent: Sep. 2, 2025

(54) DC SOLID STATE CIRCUIT BREAKER AND DC CIRCUIT BREAKER SYSTEM

(71) Applicant: HITACHI ENERGY POWER CONVERSION SOLUTIONS SOCIEDAD LIMITADA, Seville (ES)

(72) Inventors: Javier Villegas Nunez, Seville (ES); Ricardo Medina Gracia, Seville (ES); Pablo Arévalo Aguilar, Seville (ES); Sergio Hurtado Cuerva, Seville (ES)

(73) Assignee: HITACHI ENERGY POWER CONVERSION SOLUTIONS SOCIEDAD LIMITADA, Seville (ES)

( * ) Notice: Subject to any disclaimer, the term of this patent is extended or adjusted under 35 U.S.C. 154(b) by 0 days.

(21) Appl. No.: 18/247,719

(22) PCT Filed: Sep. 7, 2021

(86) PCT No.: PCT/EP2021/074557
§ 371 (c)(1),
(2) Date: Apr. 3, 2023

(87) PCT Pub. No.: WO2023/011739
PCT Pub. Date: Feb. 9, 2023

(65) Prior Publication Data
US 2023/0411949 A1 Dec. 21, 2023

(30) Foreign Application Priority Data
Aug. 6, 2021 (ES) .................... 202130767

(51) Int. Cl.
*H02H 3/087* (2006.01)
*H02H 3/02* (2006.01)
(52) U.S. Cl.
CPC ............ *H02H 3/087* (2013.01); *H02H 3/021* (2013.01)

(58) Field of Classification Search
CPC ............................. H02H 3/087; H02H 3/021
See application file for complete search history.

(56) References Cited

U.S. PATENT DOCUMENTS

| 8,004,806 B2 * | 8/2011 | Li | H02H 3/087 |
| | | | 361/93.1 |
| 9,413,157 B2 * | 8/2016 | Tahata | H01H 33/596 |

(Continued)

FOREIGN PATENT DOCUMENTS

| CN | 106159880 A | 11/2016 |
| CN | 107834526 B | 3/2019 |

(Continued)

OTHER PUBLICATIONS

Shin Dongho, et al., "Snubber Circuit of Bidirectional Solid State DC Circuit Breaker Based on SiC MOSFET," 2018 IEEE Energy Conversion Congress and Exposition (ECCE), 2018, pp. 3674-3681, doi: 10.1109/ECCE.2018.8557542.

(Continued)

*Primary Examiner* — Thienvu V Tran
*Assistant Examiner* — Muaamar Qahtan Al-Taweel
(74) *Attorney, Agent, or Firm* — LUCAS & MERCANTI, LLP

(57) ABSTRACT

A DC solid state circuit breaker (SSCB) and DC circuit breaker system, the SSCB having a power module (40) with a first controlled power semiconductor (41), a DC-Link (50), a semiconductor (61) and a pre-charging system (70) with an impedance (71). The power module (40) connected between a first power terminal (31) and a second power terminal (32); the DC-Link (50) connected between the first power terminal (31) and an intermediate node (34); the semiconductor (61) connected between the intermediate node (34) and the second power terminal (32); the pre-charging system (70) connected between the intermediate node (34) and a third power terminal (33). During normal operation current can (Continued)

flow freely between the first (31) and second (32) power terminals without producing any additional losses due to the pre-charging system (70). No varistors or similar devices are required. Several SSCBs (30) may be combined for additional features.

14 Claims, 16 Drawing Sheets

(56) References Cited

U.S. PATENT DOCUMENTS

| | | | | |
|---|---|---|---|---|
| 9,742,185 | B2* | 8/2017 | Wang | H02H 3/087 |
| 9,948,089 | B2* | 4/2018 | Horinouchi | H01H 9/547 |
| 10,476,255 | B2* | 11/2019 | Kim | H04B 3/00 |
| 2021/0305980 | A1 | 9/2021 | Sim et al. | |
| 2023/0144351 | A1* | 5/2023 | Park | H02J 7/345 |
| | | | | 320/166 |

FOREIGN PATENT DOCUMENTS

| | | |
|---|---|---|
| CN | 110350491 A | 10/2019 |
| CN | 111030060 A | 4/2020 |
| CN | 112602245 A | 4/2021 |
| EP | 3093941 A1 | 11/2016 |
| WO | 2020178032 A1 | 9/2020 |

OTHER PUBLICATIONS

Patent Cooperation Treaty, International Search Report mailed Apr. 25, 2022 for the corresponding International application No. PCT/EP2021/074557, 15 pages.

Patent Cooperation Treaty, International Preliminary Report on Patentability completed on Mar. 10, 2023 for the corresponding International application No. PCT/EP2021/074557, 12 pages.

* cited by examiner

DC SOLID STATE CIRCUIT BREAKER AND DC CIRCUIT BREAKER SYSTEM

CROSS-REFERENCE TO RELATED APPLICATIONS

This application is a 371 of PCT/EP2021/074557, filed Sep. 7, 2021, which claims the benefit of Spanish Patent Application No. P202130767, filed Aug. 6, 2021, each of which are incorporated herein by reference.

FIELD

The present invention belongs to the field of electricity. In particular, the invention is an emergency protective device consisting of a circuit arrangement of power transistors, capacitors and resistors. This type of protective device is typically called a solid-state circuit breaker (SSCB) because it is capable of breaking a current flow without relying on moving parts.

BACKGROUND

Several patent and scientific documents related to the presented invention are already known in the prior art. In patent CN107834526-B a simple structure of a hybrid solid-state circuit breaker is disclosed. In patent application WO2020/178032-A1 a hybrid circuit breaker for interrupting a current in an electrical circuit line is proposed, comprising an input terminal for connection to a power line and an output terminal for connection to a DC system. In CN106159880-A a DC solid state breaker is proposed, including a short circuit protection unit, a charge switch unit and a main switch unit.

Due to the high demand of distributed generation and renewable resources in the power systems, the development of the solid-state circuit breakers, or SSCB, is a field of study. The nominal voltages and currents constantly increase for the optimization of the energetic density of the systems are supposing new challenges for the protection and manoeuvre that manage the energy sources connection. The integration of battery systems with high values of short-circuit currents and power as well as the fast dynamics that rules the system are making the conventional mechanic and thermal systems reach their functional limits.

The high development of semiconductors and components of solid state in the actual market, for more than the power electronics field and conversion of electrical energy, propel this solution as the way of solving the management of short-circuits in direct current electrical facilities as well as the fast dynamics problematics aforementioned.

Nowadays, nano grids and microgrids (such as those included in ships) need some protection against short-circuits [1]. A photovoltaic or a wind farm facility with energy storage in batteries are examples of those microgrids. Being able to interrupt the system in case of a fault is an important requirement. Although nowadays the alternating current grids (AC) prevails, the direct current grids (DC) are gaining attention due to their higher efficiency and easy integration with the renewable energy sources. It is for this reason that the SSCB is required in this case because of its reliability and its slight delay in fault interruption compared with mechanical breakers. At present, many solid-state circuit breakers (SSCB) solutions arise because of the study of many investigation groups [2].

The SSCB are capable of limiting the current at least one magnitude order faster than the traditional mechanical circuit breakers (this is possible due to the use of semiconductors). As a consequence, power losses on semiconductors are higher than in traditional mechanical circuit breakers. It leads to greater losses making crucial for its performance a deep thermal design. There are some important facts to consider such as the general system efficiency, opening losses and current detection of the fault that drives into a higher energy in the opening.

The SSCB implementation in power grids can be differentiated in low-voltage (LV) and medium-voltage (MV)/high-voltage (HV) grids, and at the same time in AC and DC grids. The requirements for all the cases are always the same, performing rapidly and in an effective way the protective short-circuit operation preventing the components breaking that integrates the grid through the effective fault clearance.

In alternating current (AC) grids, the short-circuit clearance is easy executed, opening the current in the zero crossings, what makes zero the instantaneous energy stored in the stray inductance from the short-circuit loop and does not allow any electric arc produced by the energy collapse from this inductance.

In direct current (DC) grids, the current never makes zero crossing in presence of a short-circuit and depending on the inductance of the power loop, the rise ratio of the short-circuit current could be higher or lower. In this way, the objective in DC is to open the short-circuit current as quickly as possible and this involves systems that absorb the energy of that inductance through overvoltage protection circuits like snubbers and varistors.

The main applications of low-voltage DC grids are distribution in DC and battery systems. An example could be small energetic communities and distributed generation systems with batteries. The DC grids could have current faults much higher than its nominal current. It depends on the nature of the grid, where, depending on the managed power, could reach 150 kA in a few microseconds as in the case of batteries. These high values can cause a catastrophic failure in the system.

In DC distribution, loads and conversion systems have capacitors in order to reduce the voltage ripple and stabilize the supply conditions and, in addition, these capacitors filter the high frequencies due to switching semiconductors from power converters. These capacitors present some issues because of the low impedance when they are connected to the power grid, producing high connection currents when they are discharged and are trying to store the necessary energy to equalize with the voltage where they are connected. In the same way, in case of a low impedance fault, the dynamic discharge from these capacitors makes a huge energy contribution until they are completely discharged or the fault is cleared. These instantaneous energy contributions involve short time high magnitude current peaks that are not cleared by the typical circuit breakers.

Furthermore, the same issues appear in medium-voltage (MV) grids, but in addition, the limitation of semiconductors appears due to the high voltage management. Complex series and parallel semiconductors grids and advanced protections integrate the SSCB for MV grids.

Nowadays, the main challenge is making a great protection in DC treating different materials and topologies. Not only silicon semiconductors are used. The SiC (silicon-carbide) and GaN (gallium-nitride) based semiconductors known as Wide-Bandgap Semiconductors are used in [3]. A monolithic bidirectional GaN is used in [4] for a SSCB.

Also, bidirectional SSCB based on other materials and connected together as a main static switch exists such as SiC JFET.

Taking into account their thermal characteristics in front of a short-circuit, the SiC treated devices have a better behaviour because of its lower resistance [5]. Also, self-powered SSCB that can be connected directly without extra wiring or exterior supply exists [6] and other alternatives such as a SiC based in MOSFET for solving the issue of quick interruption of overvoltage and in addition do not reduce the quick interruption capacity of the SSCB.

At present, ultraquick SSCB that uses SiC as the main switch, a semiconductor limiter and as a controller are being explored. This topology can operate in three different states: switched on, linear current limiter and switched off. The existence of old systems, the electrical system decentralization and its distribution complicate the local infrastructure of the system and also generate new issues due to the bidirectional power flow in contrast with the single direction flow of the traditional system. The SSCB is capable of solving all these problems.

It is possible that during a short-circuit a strong voltage drop occurs in medium-voltage grids, affecting some instruments or electronic elements as domestic power supplies. It is outlined in [7] the affection of voltage surges or voltage drops produced by the fault clearance and it is described the impact of the chosen semiconductors for the SSCB in the grid. In low-voltage it is also needed some quick protection against short-circuits and because of the slow behaviour of the mechanical switches, the hole systems must be oversized generating higher costs. In [8] an IGCT based design for a SSCB for multiple parallel loads is analysed from a thermal point of view, including the absorbed power by the semiconductor in the short-circuit clearance.

The SSCB protection against a surge is one of the main concerns because of the possible collapse of the energy stored in the system stray inductance in the SSCB. The SSCB has been optimized for continuous power supplies in DC with RCD+MOV in order to reduce the voltage stress of the device. The SSCB offers other significant advantages in high-voltage, such as high velocity and durability.

A pre-charged capacitor topology is proposed in [9] to smooth the operating surges and avoid the errors in the semiconductor series. The SSCB modularity concept is extended into HVDC (High Voltage Direct Current). A semiconductor grid based on IGBT technology conceived as protective cells is configured with fault management and short-circuit current limitation. The surge protective considerations of the semiconductors are the same in HVDC but the solutions are escalated to the nominal voltage ranges.

Taking into account silicon-based material, there are more solutions than the IGBT base ones in HVDC. Furthermore, IGCTs, IEGTs, SCR, GTO, CS-MCT, and other technologies emerge depending on the nominal powers (voltages and currents). There are bidirectional SSCB that are currently being implemented with unidirectional conduction devices connected in anti-series configuration or recently base on optimized RB-IGCT development in order to have very low conductance losses [10], [11].

According to the state of the art, the proposed invention aims to solve the problem of efficiency in SSCB systems by eliminating intermediate components that cause losses while maintaining a fully functional system in operation and clearing faults in DC systems.

REFERENCES

[1] Shen, B. Z. J. (2016). *Ultrafast Solid-State Circuit Breakers*.

[2] Mokhberdoran, A., Carvalho, A., Leite, H., & Silva, N. (2014). A review on HVDC circuit breakers. *IET Conference Publications,* 2014 (CP651), 1-6. https://doi.org/10.1049/cp.2014.0859

[3] Shen, Z. J., Sabui, G., Miao, Z., & Shuai, Z. (2015). Wide-bandgap solid-state circuit breakers for DC power systems: Device and circuit considerations. *IEEE Transactions on Electron Devices,* 62(2), 294-300. https://doi.org/10.1109/TED.2014.2384204

[4] John Shen, Z., Miao, Z., Roshandeh, A. M., Moens, P., Devleeschouwer, H., Salih, A., Padmanabhan, B., & Jeon, W. (2016). First experimental demonstration of solid state circuit breaker (SSCB) using 650V GaN-based monolithic bidirectional switch. *Proceedings of the International Symposium on Power Semiconductor Devices and ICs,* 2016 July, 79-82. https://doi.org/10.1109/ISPSD.2016.7520782

[5] Tan, K., Liu, P., Ni, X., Peng, C., Song, X., & Huang, A. Q. (2016). Performance evaluation of multiple Si and SiC solid state devices for circuit breaker application in 380 VDC delivery system. *Conference Proceedings—IEEE Applied Power Electronics Conference and Exposition—APEC,* 2016 May, 983-989. https://doi.org/10.1109/APEC.2016.7467990

[6] Miao, Z., Sabui, G., Roshandeh, A. M., & Shen, Z. J. (2016). Design and Analysis of DC Solid-State Circuit Breakers Using SiC JFETs. *IEEE Journal of Emerging and Selected Topics in Power Electronics,* 4(3), 863-873. https://doi.org/10.1109/JESTPE.2016.2558448

[7] Schroder, S., Meyer, C., & De Doncker, R. W. (2002). Solid-state circuit breakers and current-limiting devices for medium-voltage systems. *International Power Electronics Congress—CIEP,* 2002 January, 91-95. https://doi.org/10.1109/CIEP.2002.1216642

[8] Munasib, S., & Balda, J. C. (2016). Short-circuit protection for low-voltage DC microgrids based on solid-state circuit breakers. *2016 IEEE 7th International Symposium on Power Electronics for Distributed Generation Systems, PEDG* 2016. https://doi.org/10.1109/PEDG.2016.7527062

[9] Mokhberdoran, A., Carvalho, A., Silva, N., Leite, H., & Carrapatoso, A. (2015). A new topology of fast solid-state HVDC circuit breaker for offshore wind integration applications. *2015 17th European Conference on Power Electronics and Applications, EPE-ECCE Europe* 2015, 1-10. https://doi.org/10.1109/EPE.2015.7309270

[10] Agostini, F., Vemulapati, U., Torresin, D., Arnold, M., Rahimo, M., Antoniazzi, A., Raciti, L., Pessina, D., & Suryanarayana, H. (2015). 1 MW bi-directional DC solid state circuit breaker based on air cooled reverse blocking-IGCT. *2015 IEEE Electric Ship Technologies Symposium, ESTS* 2015, 287-292. https://doi.org/10.1109/ESTS.2015.7157906

[11] Cairoli, P., Qi, L., Tschida, C., V Ramanan, R. R., Raciti, L., & Antoniazzi, A. (2019). High Current Solid State Circuit Breaker for DC Shipboard Power Systems. *2019 IEEE Electric Ship Technologies Symposium, ESTS* 2019, 468-476. https://doi.org/10.1109/ESTS.2019.8847815

SUMMARY

The proposed invention refers to a DC solid-state circuit breaker (SSCB) and the method to operate it. Being a protective device, the SSCB is connected between a DC source or energy storage system (typically a battery) and a DC load. Both DC source and DC load are protected by the operation of the SSCB.

The SSCB comprises a first power terminal, which is normally connected to the DC source, and a second power terminal, which is normally connected to the DC load. During normal operation of the DC load, these two power terminals will be connected to one another. However, upon a fault, the SSCB will break this connection.

In order to achieve this functionality, the SSCB comprises a power module which is connected between the first and second power terminals of the SSCB. The power module comprises at least one controlled semiconductor (typically an IGBT, although MOSFETs or GTOs are also valid options) capable of opening and closing the connection between the first and second terminals of the SSCB when current is circulating.

The SSCB of the present invention further comprises a DC-Link (or DC-Link capacitor, an intermediate circuit capacitor that couples different electrical grids to one DC voltage level) and at least a semiconductor capable of restricting the current flow to a specific direction. The DC-Link comprises one capacitor or more capacitors connected to one another in series and/or parallel. The semiconductor can be, for example, a diode. The DC-Link and the semiconductor are connected in series between the first and second power terminals of the SSCB, such that the DC-Link is closer to the first power terminal of the SSCB and the semiconductor is closer to the second power terminal of the SSCB.

Advantageously, this arrangement provides the following characteristics for the SSCB:
When the power module closes the connection between the first and second terminals of the SSCB, current can freely flow between these terminals. This is the state during normal operation of the DC system.
When the power module opens the connection between the first and second terminals of the SSCB, current feeding the DC load must flow through the DC-Link and the semiconductor or through the DC-Link and the precharging system (third power terminal), where the impedance is lower. This way, the DC-Link will charge, producing a voltage that opposes the current flow. The current flow will consequently decrease, eventually disappearing. This is the intended state upon a fault on the DC load.

In order to reduce the fault current as quickly as possible, the DC-Link is charged before operating the DC load. The DC-Link also stays charged during normal operation. To achieve this, the SSCB further comprises a third power terminal. This terminal is intended to be connected to a different voltage than the first power terminal. For example, if the first power terminal is connected to the positive pole of the DC source, then the third terminal can be connected to the negative pole of the DC source, and vice versa (depends on circuit topology and system voltages).

An intermediate node between the DC-Link and the semiconductor is connected to the third power terminal through a pre-charging system. The pre-charging system comprises an impedance (preferably a resistor) and, optionally, a first contactor connected in parallel with the impedance.

If present, the first contactor is open before operation begins, so that the DC-Link is slowly charged due to the current flowing through the impedance. Once the DC-Link is sufficiently charged, the first contactor closes. This way, when operation begins, the DC-Link voltage is the voltage difference between the first and third power terminals of the SSCB.

Advantageously, placing the pre-charging system this way minimizes the current that flows through the first contactor during normal operation, start-up and first connection, because the capacitor is already charged. This circuit arrangement also reduces the pre-charging system losses during normal operation, which would be higher if the pre-charging system was placed between the DC-Link and the first power terminal.

Maintaining the first contactor closed during faults ensures that the DC-Link voltage will not change significantly due to any current flowing through the impedance. This way, the necessary time to reduce the fault current is reduced. It also forces the voltage between the second and third power terminals to be limited, preventing any power from feeding the fault. Additional contactors may be included in the pre-charging system for other advantages.

The minimum steps to be followed when commanding the SSCB, for instance by means of a control unit, comprises:
1. Before operating the DC system, the DC-Link is pre-charged through the pre-charging system. This step is achieved by connecting the first and third power terminals and, if present, maintaining the first contactor open until the DC-Link is sufficiently charged and closing it once its voltage reaches a certain threshold.
2. Once the DC-Link is charged, the power module is commanded to close the connection between the first and second power terminals of the SSCB. This way, the DC load becomes connected to the DC source and can be operated normally. At this point the second power terminal is connected to the DC load and the power module is commanded to close the connection.
3. Upon a fault detection or when the DC load is intended to be disconnected, the power module is commanded to open the connection between the first and second power terminals of the SSCB. This way, any overcurrent due to the fault will be forced to go through the semiconductor or the third power terminal, and the voltage between the second and third power terminals will be limited and no additional power will be allowed to feed the fault.

BRIEF DESCRIPTION OF DRAWINGS

As a complement to the description and in order to help the understanding of the intended characteristics, the present description is accompanied by various figures.

DETAILED DESCRIPTION

In connection with the figures, several possible embodiments of the invention are further detailed. The presented embodiments are meant to be considered as illustrative examples, which are not intended to limit the scope of the invention.

Figure 1:
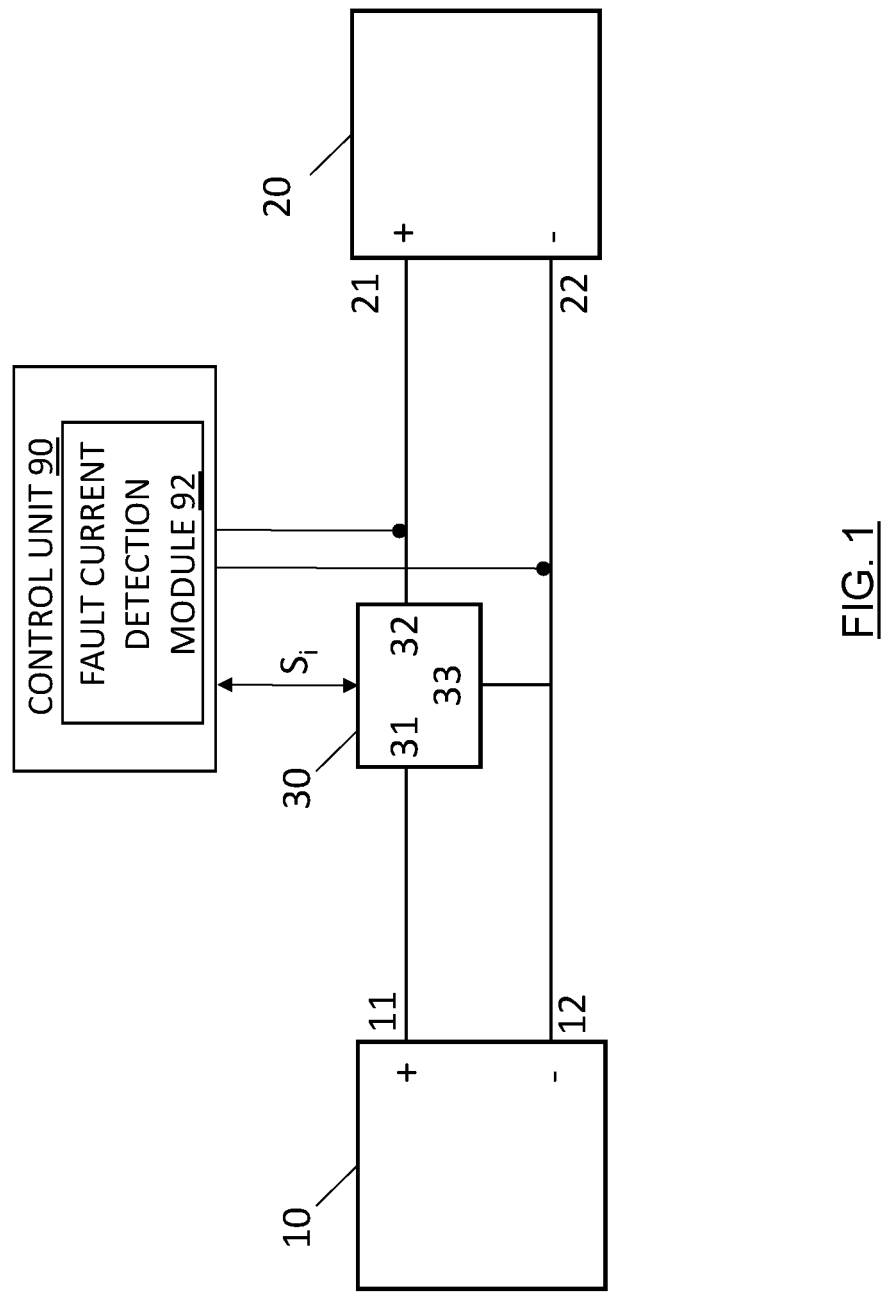
FIG. 1 represents, according to a first aspect of the present invention, a DC circuit breaker system for a DC system including a DC source connected to a DC load.

FIG. 1 shows a DC circuit breaker system according to a first aspect of the present invention. The circuit breaker system comprises at least one DC solid-state circuit breaker, SSCB (30), and a control unit (90). The circuit breaker system is used for protecting DC systems of the type comprising a DC source (10) providing energy to a DC load (20), wherein the DC source (10) is connected to the DC load (20) through the at least one SSCB (30) of the circuit breaker system.

The control unit (90) of the circuit breaker system is configured to control the operation of the at least one SSCB (30). The control unit (90) may comprise a fault current detection module (92) configured to detect a fault current on the DC source (10), and/or the DC load (20) and/or the complete DC system.

The DC source (10) may be any DC system that can provide energy in the event of a fault or short circuit, such as a set of batteries, an AC/DC or DC/DC power converter or a bank of supercapacitors. The DC source (10) may comprise some internal protections, like fuses. The DC load (20) may be any DC powered device, such as a DC passive load, a converter or an electronic load. The SSCB (30) is intended to protect the DC load (20) and also the DC source (10), with a fast response avoiding blowing the fuses of the DC source (10) which are not able to rearm. Therefore, the SSCB (30) may extend the lifespan of the DC source (30) protections. Additionally, the SSCB (30) can be used for adjusting the protection limits of the DC load (20) in the case the absolute current limits are different of the existing protections of the DC source (10).

Both the DC source (10) and the DC load (20) comprise a positive terminal (11 and 21) and a negative terminal (12 and 22). In the embodiment depicted in FIG. 1 the SSCB (30) is connected between the positive terminals of the DC source (10) and the DC load (20):

A first power terminal (31) of the SSCB (30) is connected to the positive terminal (11) of the DC source (10).

A second power terminal (32) of the SSCB (30) is connected to the positive terminal (21) of the DC load (20).

A third power terminal (33) of the SSCB (30) is connected to the negative terminal (12) of the DC load (20), which, in this example, is also connected to the negative terminal (22) of the DC load (20).

Although in the example of FIG. 1 the third power terminal (33) of the SSCB (30) is connected to the negative pole or terminal (12) of the DC source (10), the third power terminal (33) may be instead connected to an intermediate voltage of the DC source (10).

Therefore, the first (31) and second (32) power terminals of each SSCB (30) are respectively connected to terminals of the same polarity of the DC source (10) and the DC load (20), or vice versa; and the third power terminal (33) of the corresponding SSCB (30) is connected to a terminal of opposite polarity, or an intermediate voltage, of the DC source (10).

Connecting an SSCB (30) on the positive pole (positive terminals 11 and 21) is a common practice, although in another embodiment the SSCB (30) may be connected between the negative terminals (12, 22) of the DC source (10) and the DC load (20) respectively through the first (31) and second (32) power terminals. In that case the third power terminal (33) of the SSCB (30) would be connected to the positive terminal (11) or an intermediate voltage of the DC source (10).

Figure 2:
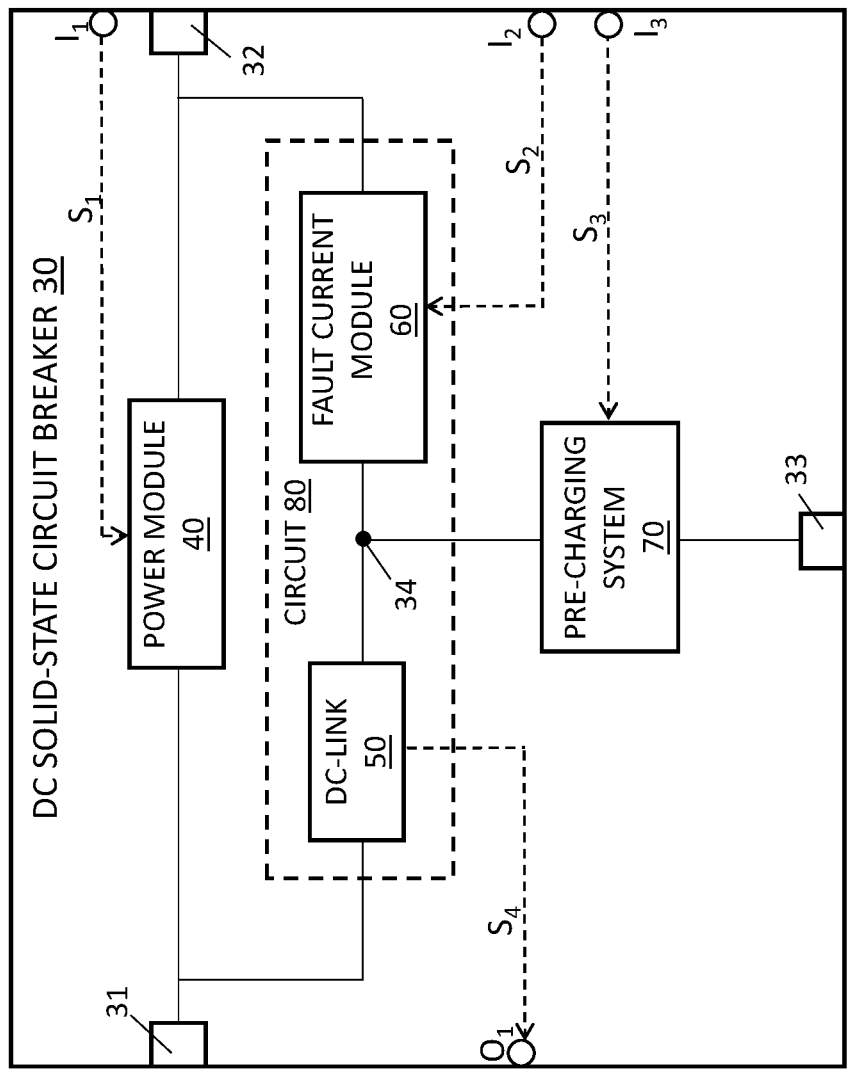
FIG. 2 depicts a schematic view of a SSCB according to an embodiment of the present invention.

According to a second aspect of the present invention, it is provided a DC circuit breaker system, SSCB (30). FIG. 2 depicts a schematic view of a SSCB (30) according to an embodiment of the present invention. The SSCB (30) comprises first (31), second (32) and third (33) power terminals, a power module (40), a circuit (80) connected in parallel with the power module (40) and a pre-charging system (70).

Figure 3:
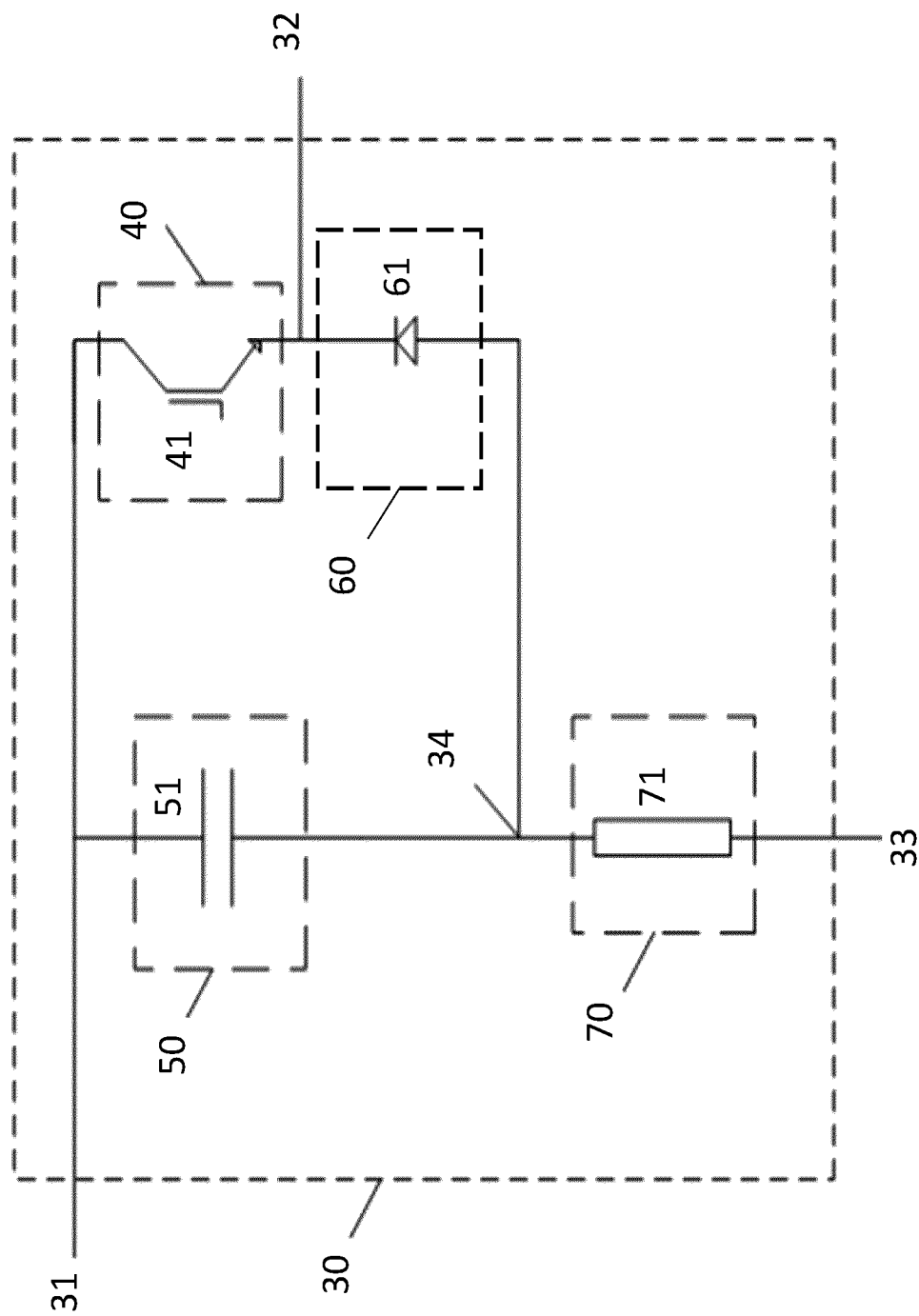
FIG. 3 shows an embodiment of the SSCB with the minimum required components.

FIG. 3 shows, according to a first embodiment, the electronic components of the SSCB (30) which can be connected as depicted in FIG. 1.

The power module (40) is connected between the first (31) and second (32) power terminals and comprises at least a first controlled semiconductor (41) configured to interrupt the flow of current between the first (31) and second (32) power terminals.

The circuit (80) comprises a DC-Link (50) in series with a fault current module (60). The DC-Link (50) comprises at least one capacitor (51). The fault current module (60) is connected between the second power terminal (32) and an intermediate node (34) of the circuit (80) located between the DC-Link (50) and the fault current module (60). The fault current module (60) comprises a semiconductor (61) configured to constrain the current flow to only one direction (i.e. towards the intermediate node (34) or towards the second power terminal (32)).

The pre-charging system (70) is connected between the third power terminal (33) and the intermediate node (34) of the circuit (80). The pre-charging system (70) comprises at least one pre-charging impedance (71) through which the at least one capacitor (51) of the DC-Link (50) is pre-charged. The pre-charging of the DC-Link (50) is performed prior to the normal operation of the SSCB (30).

The first controlled semiconductor (41) may be any semiconductor able to interrupt the current flow. For instance, in the embodiment of FIG. 3 the first controlled semiconductor (41) is an IGBT, a balanced option between voltage and speed. A GTO would be another option suitable for higher voltage applications, though at the cost of lower speed. For lower voltage and a faster reaction, a MOSFET would be more recommendable. Other controlled semiconductors may be used as the first controlled semiconductor (41). Series and/or parallel connection of two or more controlled semiconductors (41) is also possible, although they may require the usual balancing resistors, as well as the necessary measures to ensure they all act at the same time according to common practice. Using SiC-based or GaN-based controlled semiconductors is possible as well. The first controlled semiconductor (41) must be capable of opening the circuit while current is flowing through it.

In the embodiment of FIG. 3, the circuit (80) in parallel with the power module (40) connects the first (31) and second (32) power terminals. The DC-Link (50) of the circuit (80) is closer to the first power terminal (31) and the semiconductor (61) is closer to the second power terminal (32).

In the DC-Link (50), which includes at least one capacitor (51), several capacitors may be connected in series in order to sustain higher voltage. Alternatively, or additionally, several capacitors may be connected in parallel in order to increase the total capacitance of the DC-Link (50).

Unlike the first controlled semiconductor (41), the semiconductor (61) of the fault current module (60) is not required to be a controlled semiconductor. The semiconductor (61) only needs to restrict the current flow to one direction, so a diode is a valid option. Several diodes in series and/or parallel can also be employed for higher voltage or current. A permanently activated silicon controlled rectifier (SCR) would also work, though it would be unnecessarily expensive. Although FIG. 3 shows the semiconductor (61) pointing towards the second power terminal (32), this is not always the case (it may be pointing towards the intermediate node (34), as it will be later shown in the examples of other figures, depends on the topology).

The pre-charging impedance (71) of the pre-charging system (70) is preferably a resistor, although it could be a coil or any combination of coils and resistors.

Figure 4B:
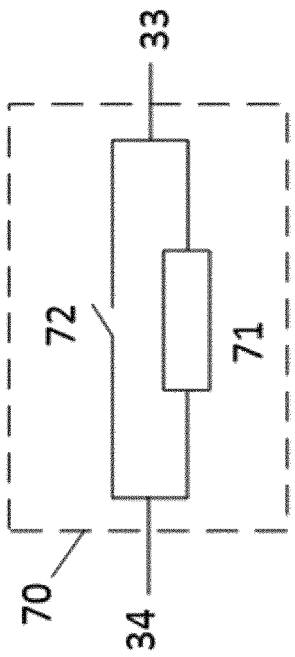
FIGS. 4A-4D show four different embodiments of the pre-charging system.
Figure 4D:
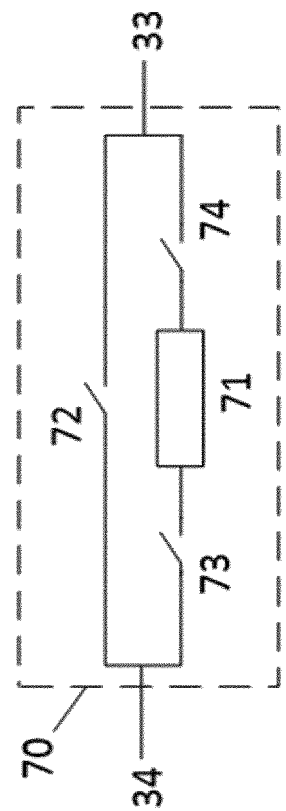
Figure 4A:
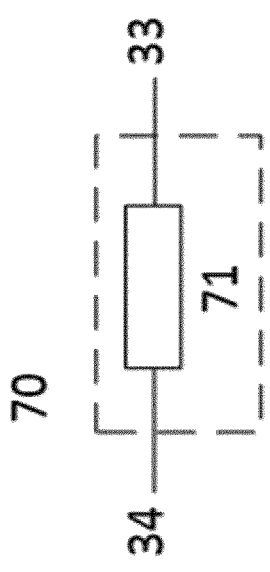

FIGS. 4A-4D show possible variants of the pre-charging system (70). The simplest approach is shown in FIG. 4A, where the pre-charging system consists of only the pre-charging impedance (71).

In the embodiment of FIG. 4B the pre-charging system (70) further comprises a first contactor (72) connected in parallel with the pre-charging impedance (71). This first contactor (72) is intended to close once the DC-Link (50) is charged. This provides an advantage: the DC-Link voltage becomes fixed to the voltage between the first (31) and third (33) power terminals of the SSCB (30). In addition, the embodiment of FIG. 4B reduces the losses produced by currents maintaining the DC-Link (50) charged. Finally, it changes the evolution of the current path during the fault breaking process so that the final path is reached almost immediately.

Figure 4C:
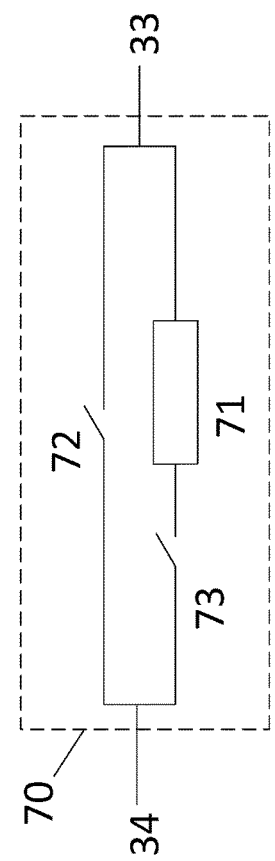

In the embodiments of FIGS. 4C and 4D the pre-charging system (70) further comprises at least one additional contactor (73, 74) in series with the pre-charging impedance (71). If the first contactor (72) is present then a second contactor (73), as shown in FIG. 4C, or a second (73) and a third contactor (74), as shown in FIG. 4D, may be added to gain yet another advantage: the isolation of the pre-charging impedance (71). In this case, once the first contactor (72) has been closed, the second (73) and third (74) contactors can be opened to completely isolate the pre-charging impedance (71) from the rest of the circuit. Once isolated, the pre-charging impedance (71) may be removed without having to completely disconnect the whole circuit. This may be useful if several SSCBs (30) are to be used, as they can be pre-charged sequentially using the same pre-charging impedance (71). Nevertheless, each SSCB may have its own pre-charging system.

Figure 5:
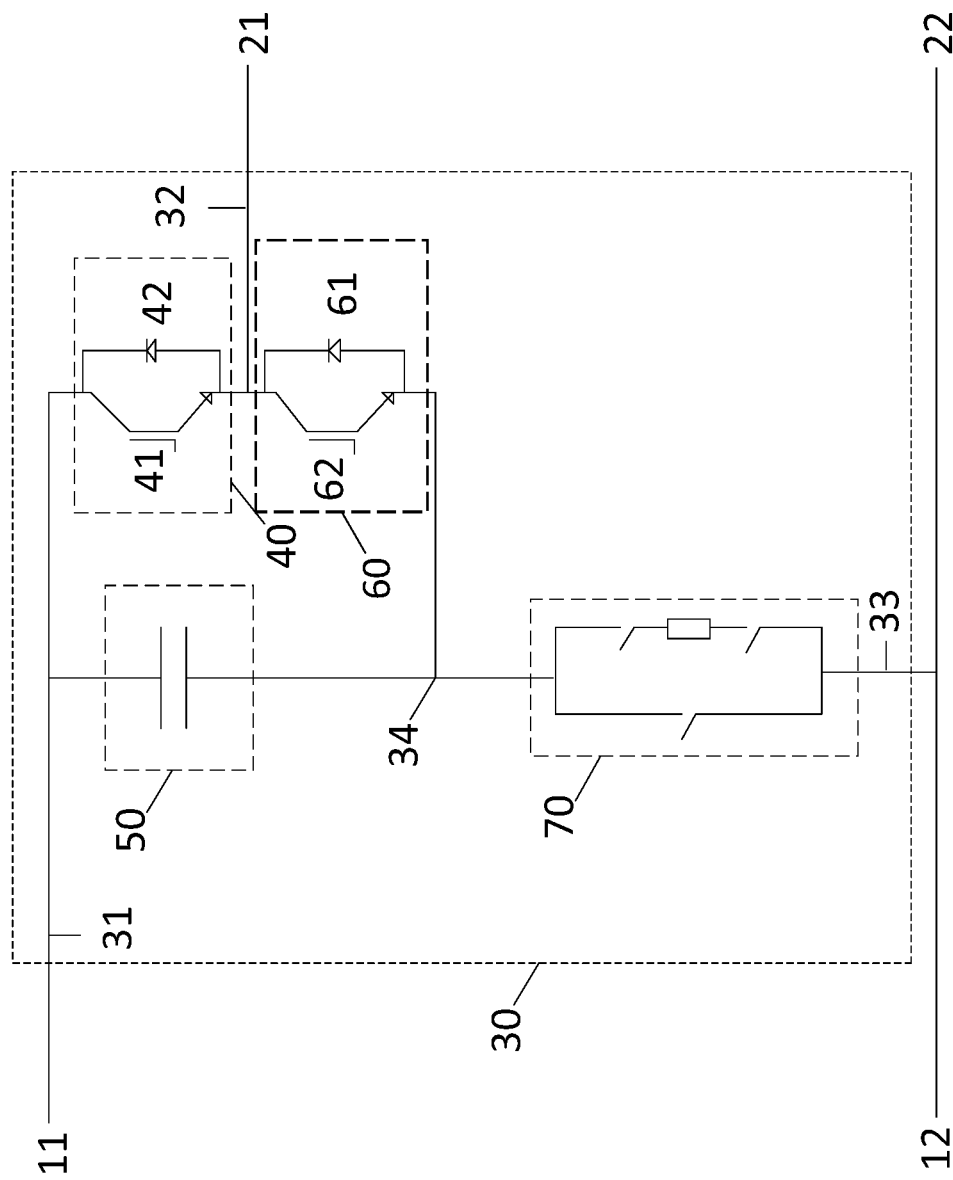
FIG. 5 shows an embodiment of the SSCB capable of opening and closing the connection between the positive pole of the DC source and the DC load.

Although the SSCB (30) can be as simple as shown in FIG. 3, it may comprise additional components. For example, FIG. 5 shows another embodiment of the SSCB (30) when connected between the positive terminals (11 and 21) of the DC source (10) and the DC load (20). The pre-charging system (70) from FIG. 4D has been selected for this embodiment, although it could work with any of the pre-charging systems depicted in FIGS. 4A-4D.

In this embodiment, the power module (40) further comprises an antiparallel diode (42) connected in antiparallel configuration with the first controlled semiconductor (41), and the fault current module (60) further comprises a second controlled semiconductor (62) connected in antiparallel configuration with the semiconductor (61). This arrangement may be useful since pairs of power transistors (41 and 62) and their respective antiparallel diodes (42 and 61) are typically packed and commercialized together. These semiconductors (41, 42, 61 and 62) along with the DC-Link (50) form a half-bridge topology capable of modulating a different voltage on the second power terminal (32). It also permits current to flow in both directions (from 11 to 21 and vice versa) during normal operation of the DC load (20).

Figure 6:
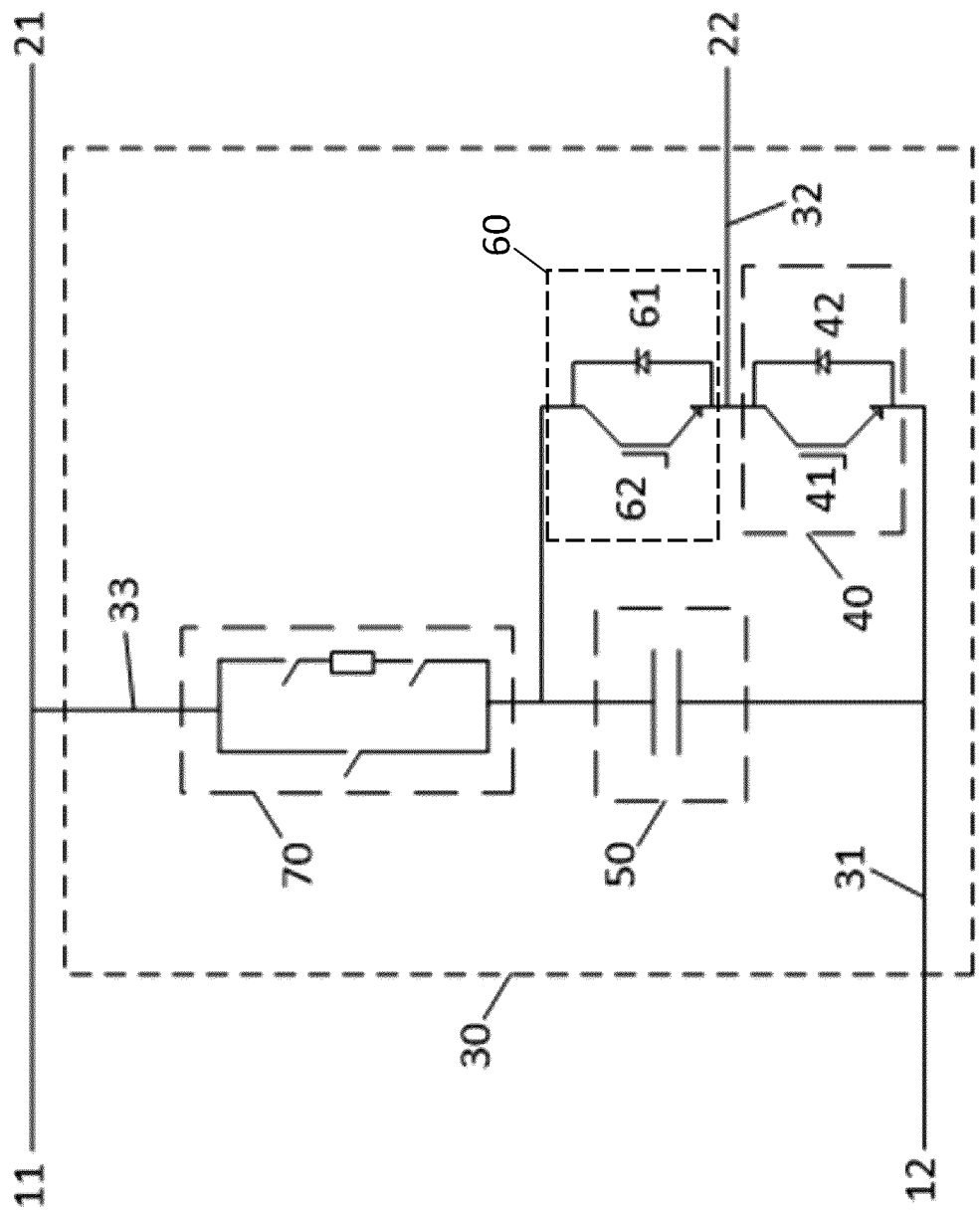
FIG. 6 shows an embodiment of the SSCB for the connection to the negative pole of the DC source and the DC load.

While FIGS. 1, 3 and 5 assume the SSCB (30) is connected through the positive terminals (11 and 21) of the DC source (10) and DC load (20), the SSCB (30) can be designed to be connected through their negative terminals (12 and 22). An example is shown in FIG. 6. This embodiment is equivalent to the one shown in FIG. 5, except this one is connected through the negative pole.

A method to operate the SSCB (30), by means of the control unit (90) depicted in FIG. 1, will be now described using the embodiment of FIG. 5 as an example. The method comprises at least three steps: pre-charge, normal operation and fault current breaking.

Figure 7:
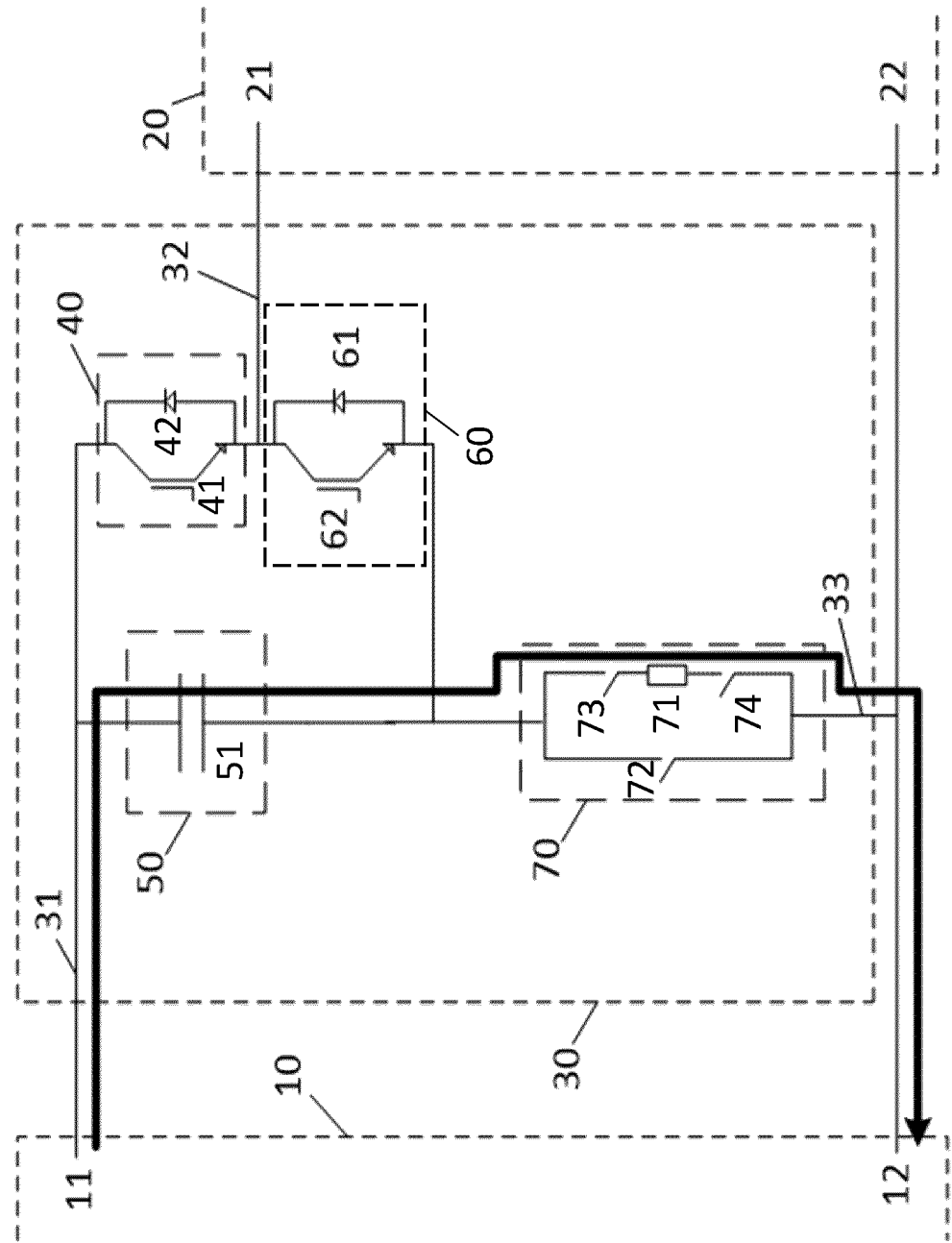
FIG. 7 shows the current path during the pre-charge of the DC-Link.

1. First, the DC-Link (50) must be pre-charged to a voltage which is similar enough to the voltage between the first (31) and the third (33) power terminals. To do so, the first contactor (72), if present, is held open, while the second and third contactors (73 and 74), if present, are kept closed. The SSCB (30) is connected to the DC-source (10) through the first (31) and third (33) power terminals. This way, current will flow as shown by the thick arrow in FIG. 7, charging the DC-Link (50). Once the voltage of the DC-Link (50) is similar enough to the voltage between the first (31) and third (33) power terminals (for instance, when the voltage of the DC-Link (50) reaches a pre-charge threshold), the first contactor (72) may be closed (if desired). After closing the first contactor (72) and checking that the current through the pre-charging impedance (71) is low enough, the second (73) and third (74) contactors may be opened (if desired).

Figure 8:
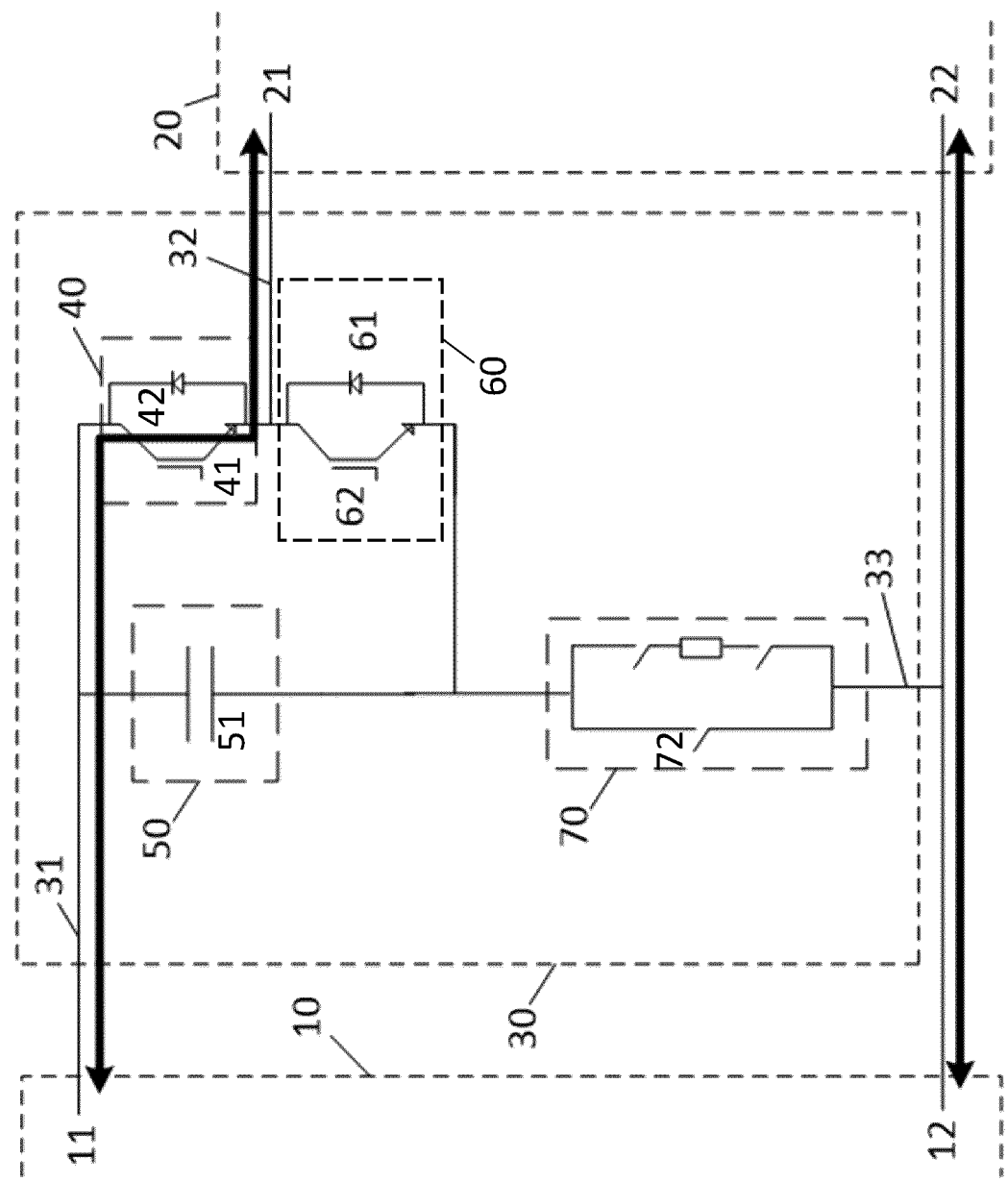
FIG. 8 shows the current paths during normal operation of the DC system.

2. After pre-charging the DC-Link (50), the DC load (20) is connected to the second power terminal (32) by activating the first controlled semiconductor (41) of the power module (40), to allow a current flow between the DC source (10) and the DC load (20). If the total voltage of the DC source (10) is intended to be applied to the DC load (20), then the first controlled semiconductor (41) is simply commanded to close the connection. If only a fraction of the DC source (10) is meant to be applied to the DC load (20), then the first controlled semiconductor (41) is commanded to modulate the appropriate voltage by rapid successions of opening/closing the connection. FIG. 8 shows in thick lines the path that the current will take in this case. During this normal operation of the SSCB (30) the current is allowed to flow in either direction (through (41) or (42)).

3. Upon a detection of a fault or an overcurrent performed by the fault current detection module (92), the power module (40) is commanded by the control unit (90) to break the connection and interrupt the current flow. To do so, the first controlled semiconductor (41) is commanded to open the connection. For safety reasons (although not strictly necessary) it is recommended to command the second controlled semiconductor (62), if present, to also open its connection. As the current intensity and the DC-Link voltage evolve the current path will change to that shown in FIG. 9 (continuous and dashed thick lines). When the DC-Link (50) is charged, absorbing the energy of the input stray inductance, the fault is cleared and the output isolated. The continuous thick line indicates the fault current flowing through the DC load (20). If the DC source (10) comprises coils or inductors, its current will follow the path marked by the dashed thick line. Otherwise, this current will drop almost immediately. These two currents, which overlap through the pre-charging system (70), may be of different amperage.

Advantageously, by having the first contactor (72) closed these two fault currents are separated, reducing any possible damage on the DC source (10). Alternatively, if the first contactor (72) is left open (or absent), then the DC-Link (50) will continue to charge (50) and some fault current will circulate through the impedance (71), increasing the voltage that opposes the fault current. The latter alternative may reduce the fault current faster, but it requires the DC-Link (50) to stand a higher voltage ripple. Besides, it does not separate the fault currents from the DC source (10) and DC load (20) so effectively.

Figure 9:
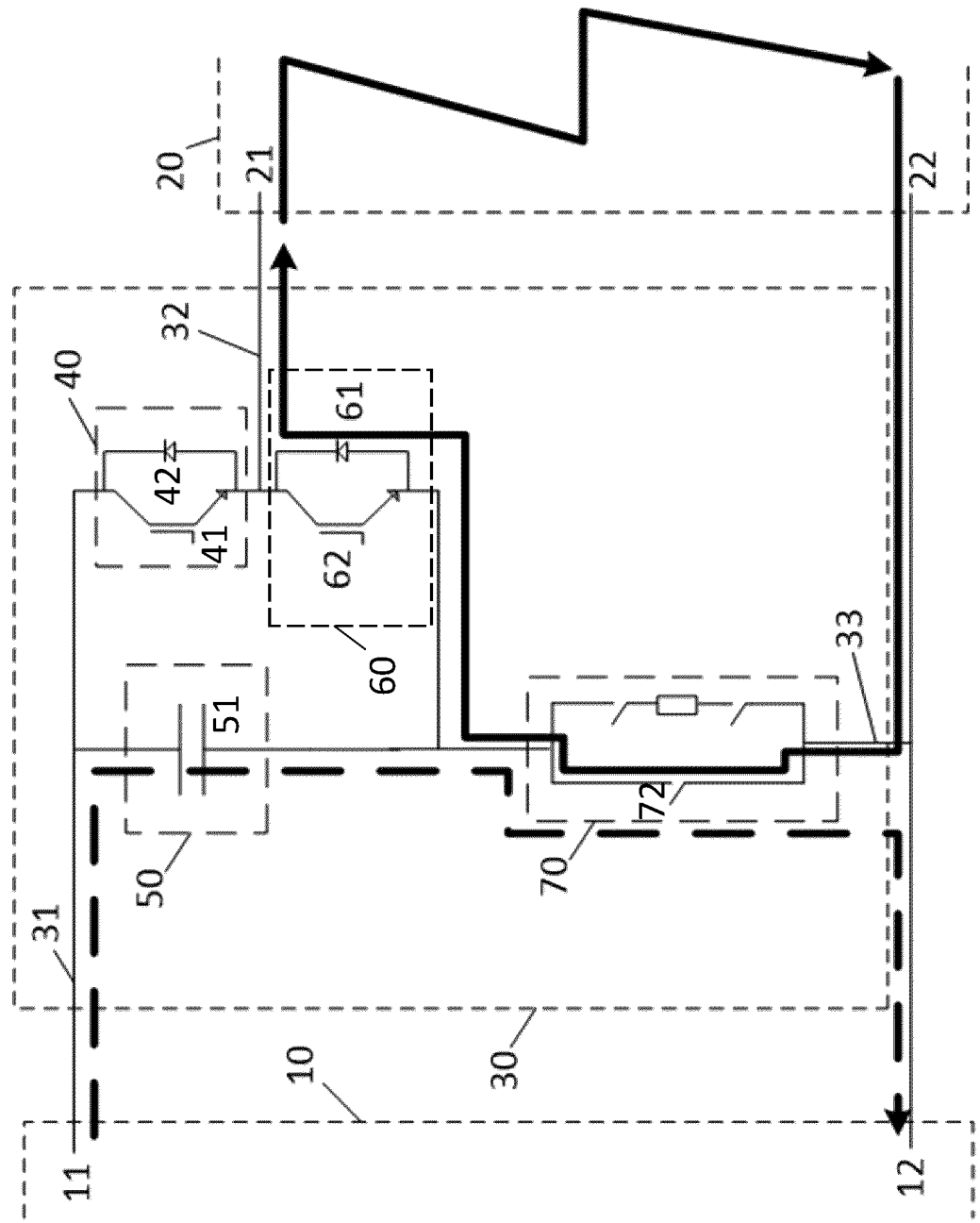
FIG. 9 shows the current paths of the current upon a fault on the DC load.

Due to the path of the fault current and the voltage of the DC-Link (50), the voltage between the terminals (21 and 22) of the DC load (20) will be null or even negative during the transient between the situations shown in FIG. 8 and FIG. 9. Consequently, no additional energy will feed the fault. The internal resistances of the DC load (20) will quickly lower the fault current to zero.

FIGS. 10 to 16 show different embodiments of a SSCB (30), or different combinations of a plurality of SSCBs (30), which may be employed for different purposes, such as opening the connection on both poles or breaking fault current in both directions.

Figure 10:
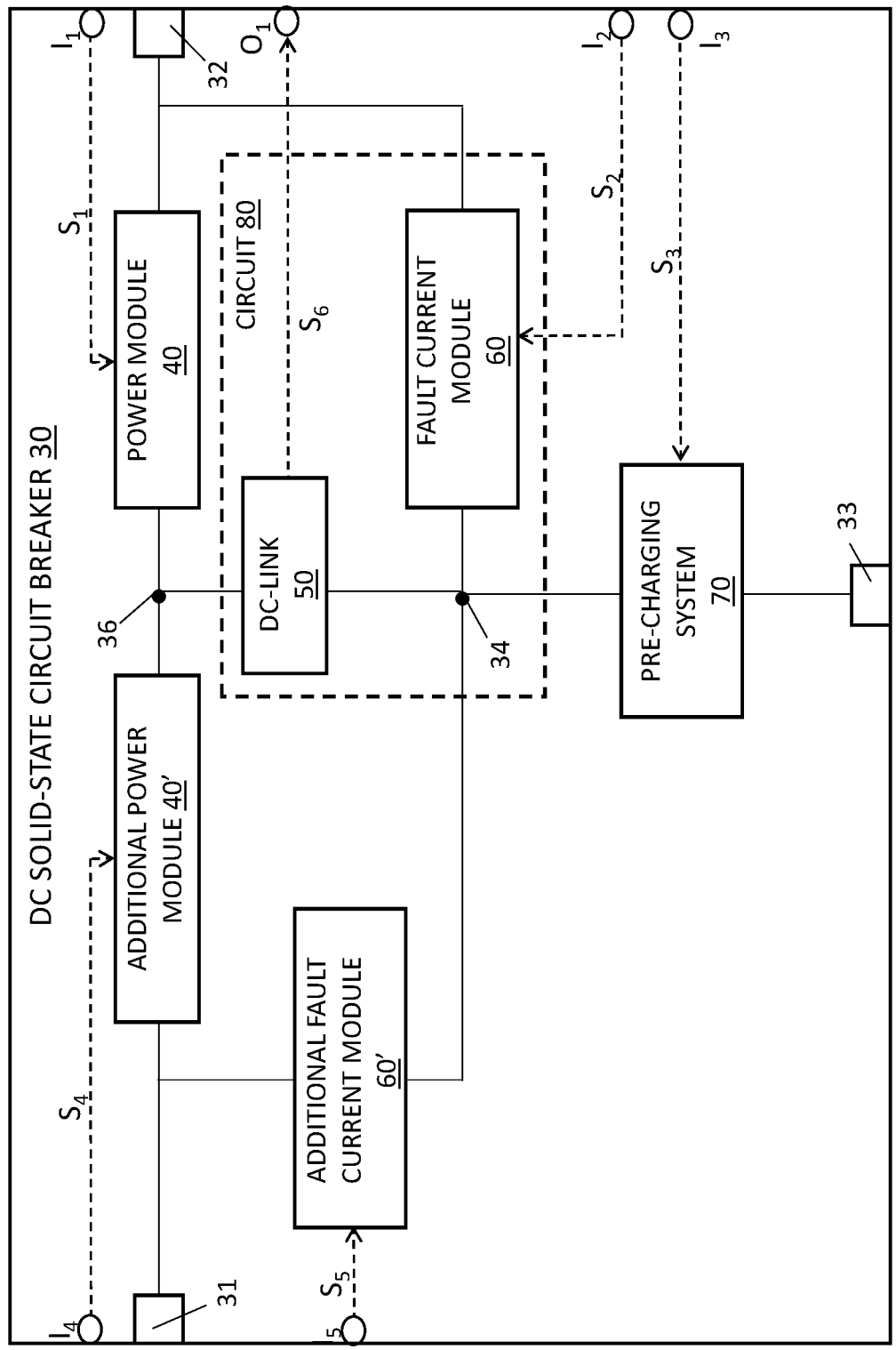
FIG. 10 depicts a schematic representation of an embodiment of a SSCB.

FIG. 10 depicts a schematic representation of an embodiment of a SSCB (30), further comprises an additional power module (40') and an additional fault current module (60'). In this embodiment, the additional power module (40') is connected in series with the power module (40), between the first power terminal (31) and an intermediate node (36). The power module (40) is connected between the intermediate node (36) and the second power terminal (32). The additional fault current module (60') is connected between the first power terminal (31) and the intermediate node (34) of the circuit (80).

Figure 11:
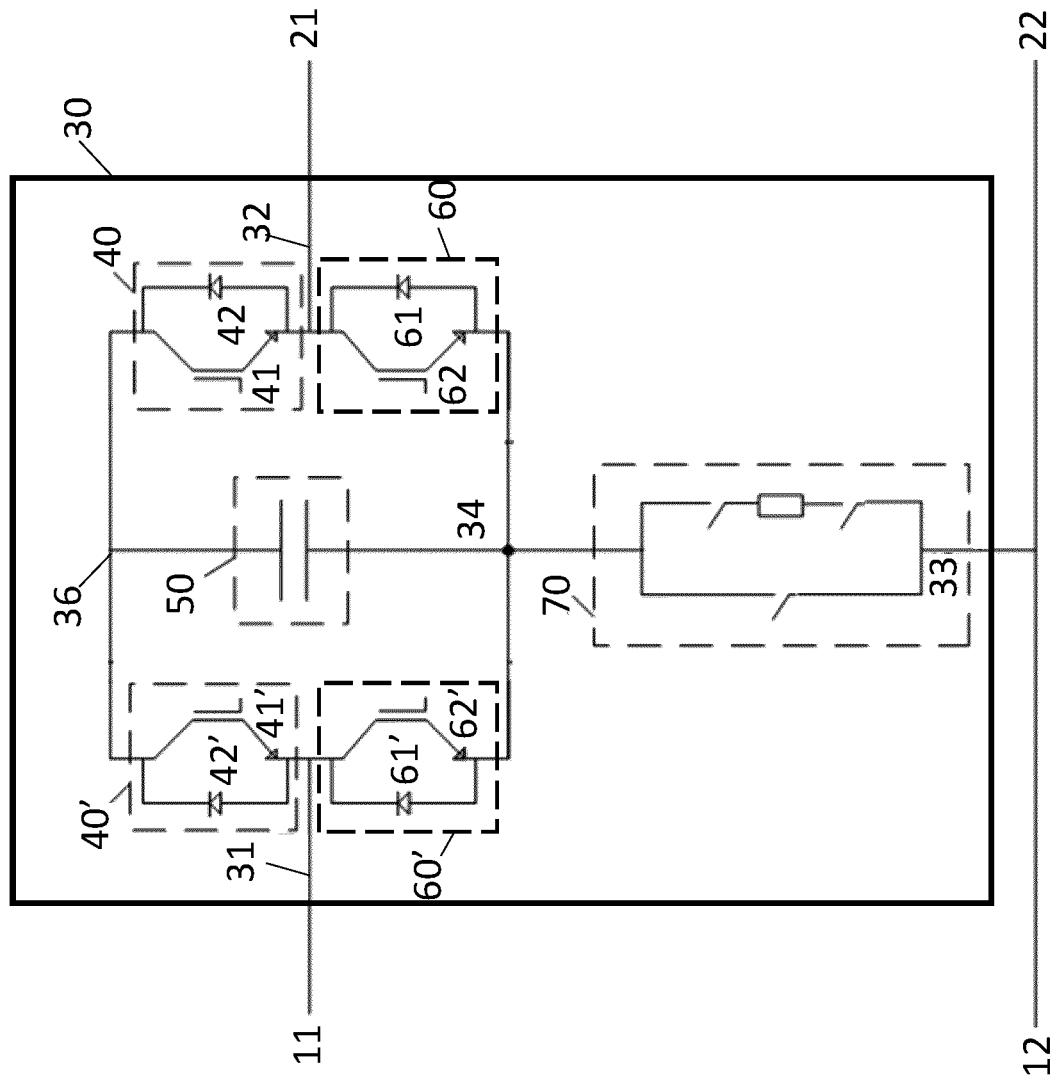
FIG. 11 illustrates an example of the components used in the arrangement of FIG. 10.

FIG. 11 illustrates an example of the components used in the arrangement of FIG. 10. Both the power module (40) and the additional power module (40') comprise a first controlled semiconductor (41, 41') configured to interrupt the current flow and an antiparallel diode (42, 42') connected in antiparallel configuration with the respective first controlled semiconductor (41, 41'). Both the fault current module (60) and the additional fault current module (60') comprise a semiconductor (61, 61') configured to constrain the current flow to only one direction and a second controlled semiconductor (62, 62') connected in antiparallel configuration with the respective semiconductor (61, 61').

The SSCB (30) of FIG. 11 is able to break the current in either direction, a current due to a fault on the DC source (10) and a current due to a fault on the DC load (20). The first power terminal (31) is connected to the positive terminal (11) of the DC source (10), the second power terminal (32) is connected to the positive terminal (21) of the DC load (20) and the third power terminal (33) is connected to the negative terminals (12 and 22) of both the DC source (10) and the DC load (20).

Figure 12:
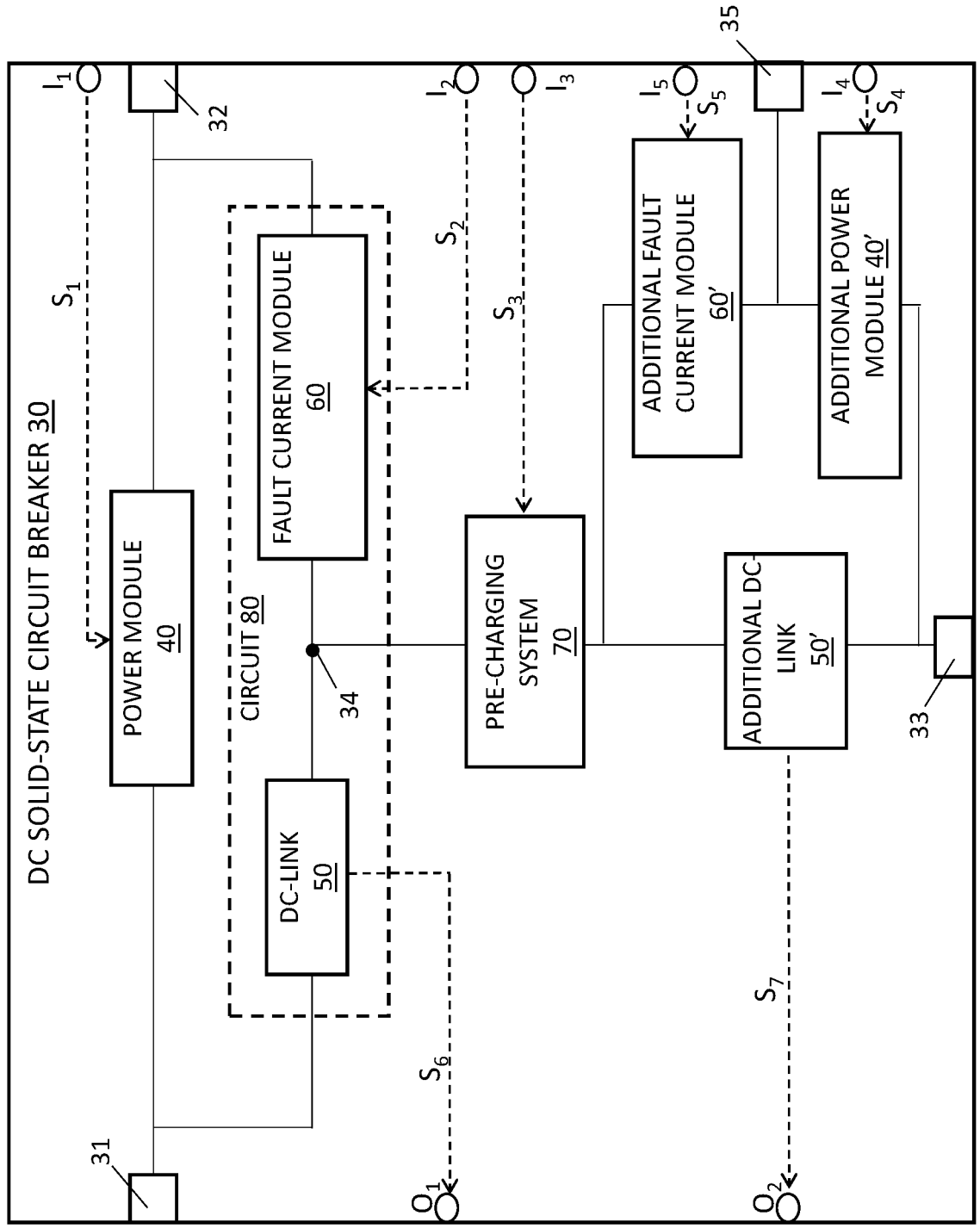
FIG. 12 shows a schematic representation of another embodiment of a SSCB.

FIG. 12 shows a schematic representation of another embodiment of a SSCB (30). As with the embodiment of FIG. 10, the SSCB (30) further comprises an additional power module (40') and an additional fault current module (60'), but arranged at different locations. In this embodiment the SSCB (30) also comprises a fourth power terminal (35) and an additional DC-Link (50'). In this case, the additional fault current module (60') is connected between the pre-charging system (70) and the fourth power terminal (35), the additional DC-Link (50') is connected between the pre-charging system (70) and the third power terminal (33), and the additional power module (40') is connected between the third power terminal (33) and the fourth power terminal (35).

Figure 13:
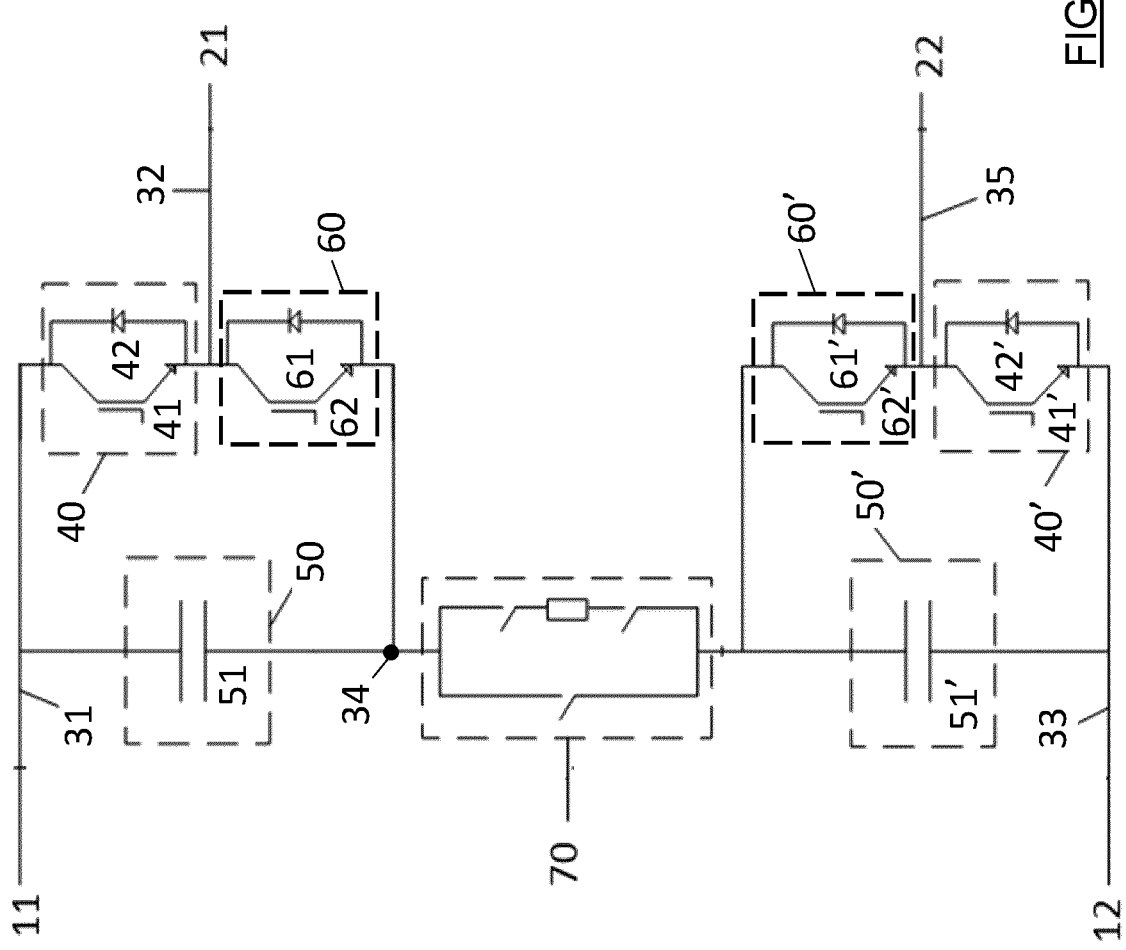
FIG. 13 represents an example of the arrangement of FIG. 12.

FIG. 13 represents an example of the arrangement of FIG. 12, wherein:

Both the power module (40) and the additional power module (40') comprise a first controlled semiconductor (41, 41') configured to interrupt the current flow and an antiparallel diode (42, 42') connected in antiparallel configuration with the respective first controlled semiconductor (41, 41').

Both the fault current module (60) and the additional fault current module (60') comprise a semiconductor (61, 61') configured to constrain the current flow to only one direction and a second controlled semiconductor (62, 62') connected in antiparallel configuration with the respective semiconductor (61, 61').

Both the DC-Link (50) and the additional DC-Link (50') comprise at least one capacitor (51, 51').

An advantage of the topology of FIG. 13 is that the respective DC-links (50, 50') are required to withstand only half of the original voltage.

Figure 14:
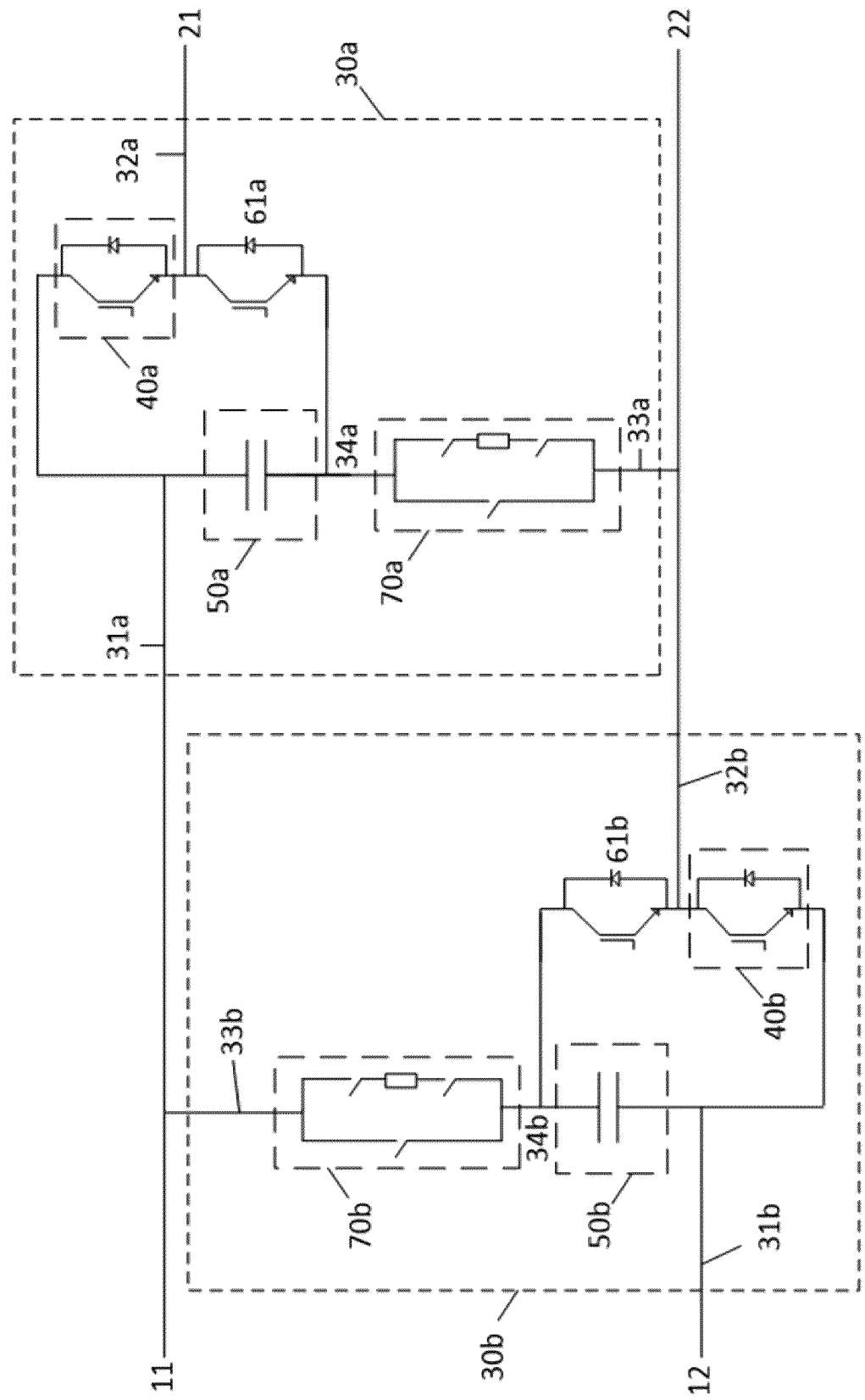
FIGS. 14, 15 and 16 show different combinations of SSCB, which can be used as part of a circuit breaker system.
Figure 15:
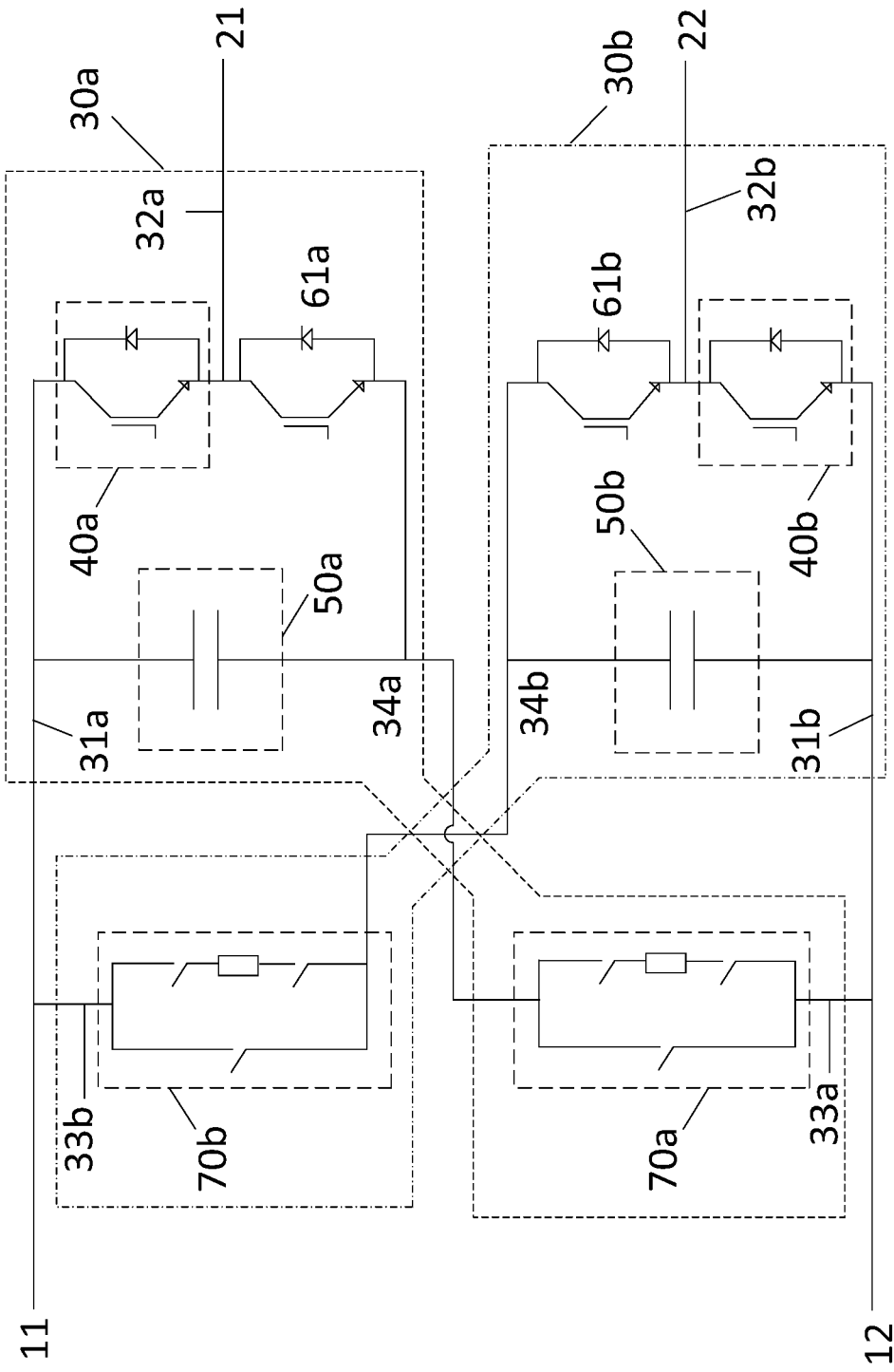
Figure 16:
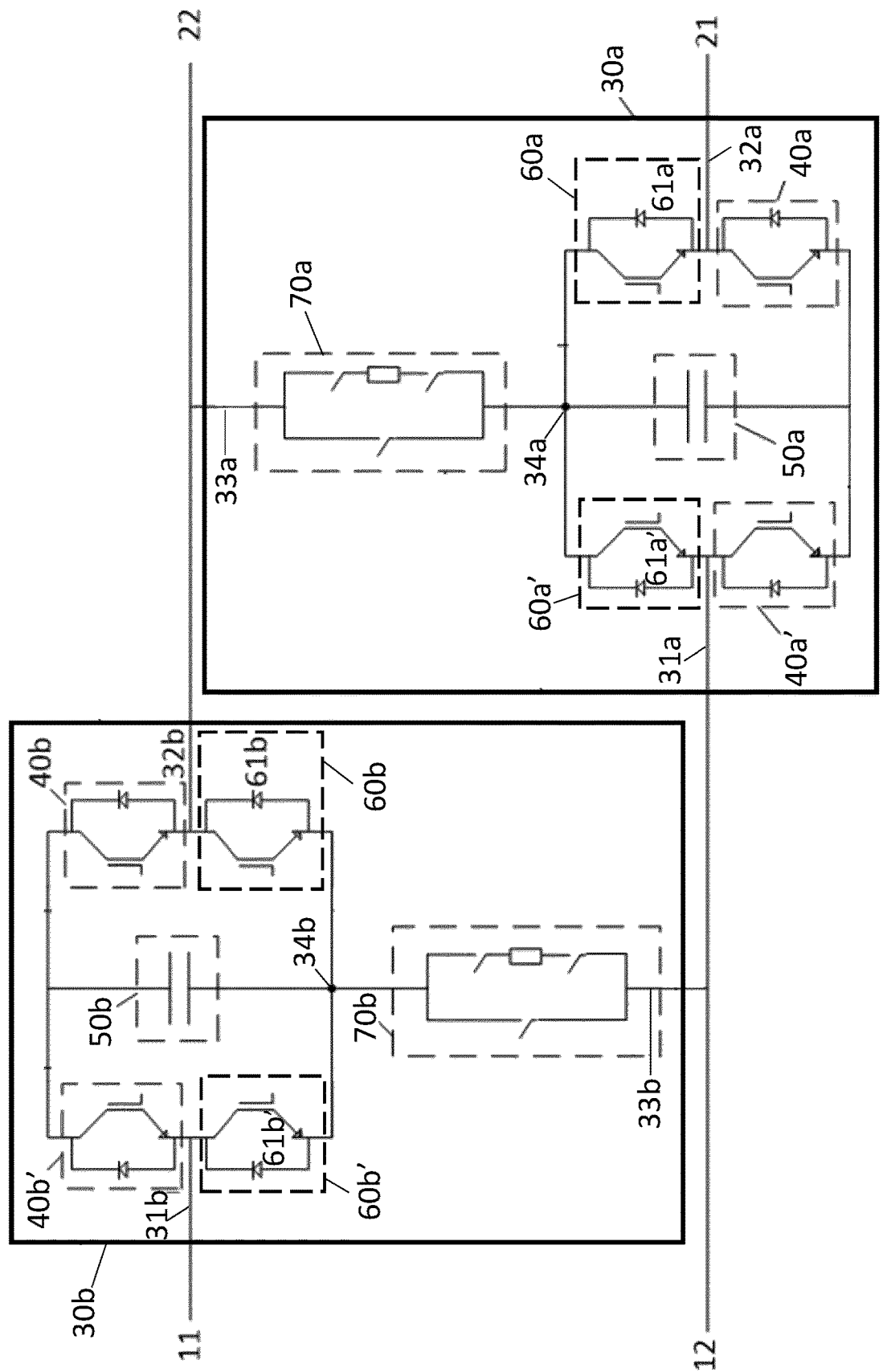

FIGS. 14, 15 and 16 depict different combinations of SSCB (30), which can be used as part of a circuit breaker system. The plurality of SSCBs (30) are controlled by a control unit (90), such as the one depicted in FIG. 1.

In some embodiments, such as the ones shown in FIGS. 14 and 16, the circuit breaker system comprises a first SSCB (30a) and a second SSCB (30b) connected in series between the DC source (10) and the DC load (20), such that:

The first power terminal (31a) of the first SSCB (30a) and the third power terminal (33b) of the second SSCB (30b) are connected to a first terminal of the DC source (10), the first terminal of the DC source (10) being the positive (11) or the negative (12) terminal of the DC source (10).

The second power terminal (32a) of the first SSCB (30a) is connected to a first terminal of the DC load (20), the first terminal of the DC load (20) being the positive (21) or the negative (22) terminal of the DC load (20).

The third power terminal (33a) of the first SSCB (30a) and the second power terminal (32b) of the second SSCB (30b) are connected to a second terminal of the DC load (20), wherein the first and second terminals of the DC load (20) are terminals of opposite polarity.

The first power terminal (31b) of the second SSCB (30b) is connected to a second terminal of the DC source (10), wherein the first and second terminals of the DC source (10) are terminals of opposite polarity.

In the example of FIG. 14, two SSCBs (30) are combined together to form a bipolar protective device. In this example, a first SSCB (30a), similar to the one shown in FIG. 5, and a second SSCB (30b), similar to the one shown in FIG. 6, are connected in series between the DC source (10) and the DC load (20). Upon a fault both of their power modules (40a and 40b) are commanded to open the connection at the same time. Although this combination of SSCBs (30) can only break a current due to a fault on the DC load (20), it can open both poles. Advantageously, this circuit easily separates the fault currents of the DC source (10) and the DC load (20). When the power modules (40a, 40b) are commanded to open, the fault current of the DC load (20) only circulates through the first SSCB (30a) while the fault current of the DC source (10) only circulates through the second SSCB (30b).

In the example of FIG. 16 the topologies from FIGS. 11 and 14 are combined to form a bipolar and bidirectional protection device. Advantageously, the fault currents can be broken in either direction, both poles are opened together and the current from the DC source (10) and the DC load (20) are separated during the transient.

In another embodiment, as the one depicted in FIG. 15, the circuit breaker system comprises a first SSCB (30a) and a second SSCB (30b) connected in parallel between the DC source (10) and the DC load (20), such that:

The first power terminal (31a) of the first SSCB (30a) and the third power terminal (33b) of the second SSCB (30b) are connected to the positive terminal (11) of the DC source (10).

The second power terminal (32a) of the first SSCB (30a) is connected to the positive terminal (21) of the DC load (20).

The third power terminal (33a) of the first SSCB (30a) and the first power terminal (31b) of the second SSCB (30b) are connected to the negative terminal (12) of the DC source (10).

The second power terminal (32b) of the second SSCB (30b) is connected to the negative terminal (22) of the DC load (20).

In the example of FIG. 15 the fault currents of the DC source (10) and the DC load (20) are not that easily separated. Instead, the fault currents must always go through the DC-Links (50a, 50b), whose voltage opposes the currents and lowers them quicker. Since the DC-Links (50a, 50b) are connected in parallel, their equivalent capacity is also doubled.

An expert should find obvious that other topologies combinations are possible. In particular, it is possible to obtain other bipolar and bidirectional SSCBs by combining topologies from either FIGS. 11 and 15 or FIGS. 11 and 13.

The invention claimed is:

1. A DC solid-state circuit breaker (30), comprising:
a first power terminal (31) and a second power terminal (32) connectable in series to terminals of a same first polarity of a DC source (10) and a DC load (20);
a third power terminal (33) connectable to a terminal of a second polarity, opposite to the first polarity, or to an intermediate voltage of the DC source (10);
a power module (40) connected between the first (31) and second (32) power terminals, the power module (40) comprising a first controlled semiconductor (41) configured to interrupt the current flow;
an intermediate node (34);
a DC-Link (50) comprising at least one capacitor (51), wherein the DC-Link (50) is connected between the first power terminal (31) and the intermediate node (34);
a fault current module (60) comprising a semiconductor (61) configured to constrain the current flow to only one direction, wherein the fault current module (60) is connected between the second power terminal (32) and the intermediate node (34); and
a pre-charging system (70) connected between the third power terminal (33) and the intermediate node (34), wherein the pre-charging system (70) comprises a pre-charging impedance (71) through which the at least one capacitor (51) of the DC-Link (50) is pre-charged, wherein the pre-charging system (70) further comprises a first contactor (72) connected between the intermediate node (34) and the third power terminal (33) and in parallel with the pre-charging impedance (71).

2. The DC solid-state circuit breaker of claim 1, wherein the pre-charging system (70) further comprises at least one additional contactor (73, 74) in series with the pre-charging impedance (71).

3. The DC solid-state circuit breaker of claim 1, wherein the power module (40) further comprises an antiparallel diode (42) connected in antiparallel configuration with the first controlled semiconductor (41).

4. The DC solid-state circuit breaker of claim 1, wherein the fault current module (60) further comprises a second controlled semiconductor (62) connected in antiparallel configuration with the semiconductor (61).

5. The DC solid-state circuit breaker of claim 1, further comprising:
an additional power module (40') connected between the first power terminal (31) and a second intermediate node (36) in series with the power module (40), the power module (40) being connected between the second intermediate node (36) and the second power terminal (32);
an additional fault current module (60') connected between the first power terminal (31) and the intermediate node (34).

6. The DC solid-state circuit breaker of any of claim 1, further comprising:
a fourth power terminal (35);
an additional fault current module (60') connected between the pre-charging system (70) and the fourth power terminal (35);
an additional DC-Link (50') connected between the pre-charging system (70) and the third power terminal (33); and
an additional power module (40') connected between the third power terminal (33) and the fourth power terminal (35).

7. A DC circuit breaker system, comprising:
at least one DC solid-state circuit breaker (30) according to claim 1 connected between a DC source (10) and a DC load (20); and
a control unit (90) configured to control the operation of the at least one DC solid-state circuit breaker (30).

8. The circuit breaker system of claim 7, wherein the control unit (90) comprises a fault current detection module (92) configured to detect a fault current on the DC source (10) and/or the DC load (20).

9. The circuit breaker system of claim 8, wherein the control unit (90) is configured to:
- pre-charge the DC-Link (50) of the at least one DC solid-state circuit breaker (30) through the pre-charging impedance (71) of the corresponding pre-charging system (70);
- activate the first controlled semiconductor (41) of the power module (40) of the at least one DC solid-state circuit breaker (30) to allow a current flow between the DC source (10) and the DC load (20);
- upon a fault current detection, command the first controlled semiconductor (41) of the power module (40) of the at least one DC solid-state circuit breaker (30) to interrupt the current flow.

10. The circuit breaker system of claim 9, wherein the pre-charging system (70) of at least one DC solid-state circuit breaker (30) comprises a first contactor (72) connected in parallel with the corresponding pre-charging impedance (71); and
- wherein the control unit (90) is configured to:
  - maintain the first contactor (72) open during the pre-charge of the DC-Link (50), and
  - close the first contactor (72) when the voltage of the DC-Link (50) reaches a pre-charge threshold.

11. The circuit breaker system of claim 10, wherein the pre-charging system (70) of at least one DC solid-state circuit breaker (30) comprises at least one additional contactor (73, 74) in series with the pre-charging impedance (71); and
- wherein the control unit (90) is configured to:
  - maintain the at least one additional contactor (73, 74) closed during the pre-charge of the DC-Link (50), and
  - open the at least one additional contactor (73, 74) once the first contactor (72) has been closed.

12. The circuit breaker system of claim 7, wherein the first (31) and second (32) power terminals of each DC solid-state circuit breaker (30) are respectively connected to terminals of the same polarity of the DC source (10) and the DC load (20), or vice versa; and wherein the third power terminal (33) of the corresponding DC solid-state circuit breaker (30) is connected to a terminal of opposite polarity, or an intermediate voltage, of the DC source (10).

13. The circuit breaker system of claim 7, comprising a first DC solid-state circuit breaker (30a) and a second DC solid-state circuit breaker (30b) connected in series between the DC source (10) and the DC load (20), such that:
- the first power terminal (31a) of the first DC solid-state circuit breaker (30a) and the third power terminal (33b) of the second DC solid-state circuit breaker (30b) are connected to a first terminal of the DC source (10), the first terminal of the DC source (10) being the positive (11) or the negative (12) terminal of the DC source (10);
- the second power terminal (32a) of the first DC solid-state circuit breaker (30a) is connected to a first terminal of the DC load (20), the first terminal of the DC load (20) being the positive (21) or the negative (22) terminal of the DC load (20);
- the third power terminal (33a) of the first DC solid-state circuit breaker (30a) and the second power terminal (32b) of the second DC solid-state circuit breaker (30b) are connected to a second terminal of the DC load (20), wherein the first and second terminals of the DC load (20) are terminals of opposite polarity;
- the first power terminal (31b) of the second DC solid-state circuit breaker (30b) is connected to a second terminal of the DC source (10), wherein the first and second terminals of the DC source (10) are terminals of opposite polarity.

14. The circuit breaker system of claim 7, comprising a first DC solid-state circuit breaker (30a) and a second DC solid-state circuit breaker (30b) connected in parallel between the DC source (10) and the DC load (20), such that:
- the first power terminal (31a) of the first DC solid-state circuit breaker (30a) and the third power terminal (33b) of the second DC solid-state circuit breaker (30b) are connected to the positive terminal (11) of the DC source (10);
- the second power terminal (32a) of the first DC solid-state circuit breaker (30a) is connected to the positive terminal (21) of the DC load (20);
- the third power terminal (33a) of the first DC solid-state circuit breaker (30a) and the first power terminal (31b) of the second DC solid-state circuit breaker (30b) are connected to the negative terminal (12) of the DC source (10);
- the second power terminal (32b) of the second DC solid-state circuit breaker (30b) is connected to the negative terminal (22) of the DC load (20).

* * * * *